(12) United States Patent
Winter et al.

(10) Patent No.: US 8,806,767 B2
(45) Date of Patent: Aug. 19, 2014

(54) LASER INSTRUMENT AND METHOD FOR ADJUSTING THE LASER POWER

(75) Inventors: Andreas Winter, Feldkirch (AT); Sasha Lukic, Buchs (CH); Lieu-Kim Dang, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 391 days.

(21) Appl. No.: 13/186,701

(22) Filed: Jul. 20, 2011

(65) Prior Publication Data

US 2012/0187868 A1 Jul. 26, 2012

(30) Foreign Application Priority Data

Jul. 21, 2010 (DE) .......................... 10 2010 031 634

(51) Int. Cl.
*G01C 15/00* (2006.01)
(52) U.S. Cl.
USPC ............. 33/290; 33/227; 33/228; 33/DIG. 21
(58) Field of Classification Search
CPC ........ G01C 5/00; G01C 15/00; G01C 15/004; G01C 15/02; G05D 25/00; B25H 7/00; H01S 3/10; H01S 3/101; H01S 5/06; H05B 37/02
USPC ........... 33/227, 228, 276, 281, 282, 285, 290, 33/DIG. 21; 250/231.13, 234, 235, 491.1
See application file for complete search history.

(56) References Cited

U.S. PATENT DOCUMENTS

| 4,221,483 | A | | 9/1980 | Rando |
|---|---|---|---|---|
| 4,835,545 | A | * | 5/1989 | Mager et al. ................... 347/253 |
| 5,231,428 | A | * | 7/1993 | Domoto et al. ............... 347/125 |
| 5,311,216 | A | * | 5/1994 | Hirahata et al. ............... 347/132 |
| 5,748,353 | A | * | 5/1998 | Ohtomo et al. ............ 359/197.1 |
| 5,808,771 | A | * | 9/1998 | Ohtomo et al. ............ 359/196.1 |
| 5,819,424 | A | | 10/1998 | Ohtomo et al. |
| 5,838,431 | A | * | 11/1998 | Hara et al. .................... 356/138 |
| 6,195,901 | B1 | | 3/2001 | Falb |
| 6,996,910 | B2 | * | 2/2006 | Liao ................................ 33/285 |
| 2007/0001111 | A1 | * | 1/2007 | Rueb et al. .................... 250/236 |
| 2012/0124851 | A1 | * | 5/2012 | Lukic et al. .................... 33/228 |

FOREIGN PATENT DOCUMENTS

| DE | 29 44 408 C2 | 6/1980 |
|---|---|---|
| DE | 44 21 073 C1 | 7/1995 |
| DE | 696 07 045 T2 | 10/2000 |
| EP | 2 157 404 A2 | 2/2010 |

OTHER PUBLICATIONS

European Search Report dated Oct. 21, 2013, with Statement of Relevancy (Seven (7) pages).

* cited by examiner

*Primary Examiner* — R. A Smith
(74) *Attorney, Agent, or Firm* — Crowell & Moring LLP

(57) ABSTRACT

A laser instrument and a method for adjusting the laser power is disclosed. The laser instrument includes a laser device which generates a laser beam and a rotating device which moves the laser device back and forth around an axis of rotation between a first turning point and a second turning point. The laser beam generates a laser line between a first end point and a second end point on a target surface. A control device is provided which adjusts the laser power of the laser beam as a function of a rotation angle and/or an angular velocity of the rotating device.

8 Claims, 3 Drawing Sheets

LASER INSTRUMENT AND METHOD FOR ADJUSTING THE LASER POWER

This application claims the priority of German Patent Document No. 10 2010 031 634.2, filed Jul. 21, 2010, the disclosure of which is expressly incorporated by reference herein.

BACKGROUND AND SUMMARY OF THE INVENTION

The present invention relates to a laser instrument and also relates to a method for adjusting the laser power of a laser beam.

Laser instruments that generate point-shaped and/or line-shaped laser beams are known for performing leveling or marking work in interior and exterior construction. The laser beams are used to transfer reference points or reference lines onto walls, ceilings and floors. A distinction is made in terms of these laser instruments between rotary laser instruments, which generate a line-shaped laser beam by rotating a laser beam source or beam-deflecting optics around an axis of rotation, and point and/or line laser instruments, which generate point and/or line-shaped laser beams by means of beam-forming optics such as cylindrical lenses and prisms.

Known rotary laser instruments are operated in a first operating mode, the rotation mode, a second operating mode, the line mode, and/or a third operating mode, the point mode. In rotation mode, the laser beam is moved at a constant rotation speed around the axis of rotation. In line mode, the laser beam is moved back and forth in a limited angle range between a first and second end point and in point mode the laser beam rests, i.e., the rotation speed becomes zero.

The maximal permissible laser power is limited in the case of laser instruments that may be operated without protective measures such as safety goggles. The human eye is protected by the optico-facial winking reflex in the event of accidentally looking into the laser beam momentarily. The maximum permissible laser power is dependent on the operating mode in which the laser instrument is being operated. In rotation mode, the laser beam rotates at a constant rotation speed around the axis of rotation and the laser beam meets the human eye only momentarily. In line mode, there is a deceleration and acceleration of the laser beam in the region of the end points, wherein the laser beam rests at the end points. If the laser beam meets the human eye in the region of the end points, the portion of the laser beam that is absorbed by the eye is greater and the risk of damage increases.

German Patent Document No. DE 44 21 073 discloses a known rotary laser instrument, which is operated in a rotation mode and a point mode. The laser power of the laser beam is adjusted as a function of the rotational speed of the rotating optics. No line mode is provided in DE 44 21 073.

A further problem of known rotary laser instruments which are operated in line mode is that the laser line gets fuzzy in the region of the end points. The fuzziness of the laser line arises from the deceleration and subsequent acceleration of the laser device by the motor unit.

It would be desirable to improve a laser instrument and a method for adjusting the laser power with regard to the disadvantages explained above. In contrast, the object of the present invention is making a laser instrument available in which the laser beam is as well visible as possible in line mode and the risk of damage to the user is reduced. In addition, the laser line is delineated as precisely and sharply as possible.

This object is attained with the laser instrument according to the invention and with the method for adjusting the laser power of a laser beam.

According to the invention, a control device is provided for the laser instrument, which adjusts the laser power of the laser beam as a function of a rotation angle and/or an angular velocity of the rotating device. Adjusting the laser power as a function of the rotation angle or the angular velocity of the rotating device makes it possible to utilize the maximum available laser power of the laser device in an optimal manner and simultaneously reduce the risk of damage to the user's eye.

A measuring device is preferably provided which determines the rotation angle of the rotating device around the axis of rotation, wherein the measuring device is especially preferably configured as an encoder device with a locking disk having locking elements, and a photo interrupter, wherein the locking disk is connected to the rotating device in a rotationally fixed manner. In this way, the locking disk can be connected in a fixed manner to a rotatable shaft or be connected to the rotatable shaft in a rotationally fixed manner via gearwheels or belts. The advantage of a locking disk with a fixed connection is that measurement of the rotation angle is stable from outside influences, above all, temperature. Interconnecting a transmission ratio allows the resolution of the rotation angle to be increased.

In a preferred embodiment, a second measuring device is provided, which determines the angular velocity of the rotating device around the axis of rotation. In this case, the second measuring device especially preferably determines the angular velocity from the rotation angle of the first measuring device and a time, which is recorded by a timing device.

According to the invention, the method for adjusting the laser power provides that the laser power of the laser beam is adjusted as a function of a rotation angle and/or an angular velocity of the rotating device.

In a first preferred method variant, the laser power of the laser beam is reduced to zero when falling short of a first rotation angle, which corresponds to the first end point of the laser line, and/or when exceeding a second rotation angle, which corresponds to the second end point of the laser line. In doing so, the rotating device is especially preferably decelerated or accelerated in a first angle range between the first end point of the laser line and the first turning point and/or in a second angle range between the second end point of the laser line and the second turning point. Due to the fact that the deceleration and acceleration of the rotating device take place outside of the laser line, the laser beam within the laser line can be emitted with maximum laser power. Rapidly switching the laser power from a maximum laser power to zero produces a sharply delimited laser line between the first and second end points.

In a second preferred method variant, the laser power of the laser beam decreases from a first power value to a lower second power value when falling short of a preset first angular velocity of the rotating device and/or increases from the second power value to the first power value when exceeding a preset second angular velocity of the rotating device. The laser power of the laser beam especially preferably changes continuously or rapidly from the first power value to the second power value.

Exemplary embodiments of the invention are described in the following on the basis of the drawings. These drawings are not necessarily supposed to represent the exemplary embodiments to scale, rather the drawings are executed in a schematic or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment can be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter, which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

Additional advantages, features and details of the invention are disclosed in the following description of the preferred exemplary embodiments as well as on the basis of the drawings.

DETAILED DESCRIPTION OF THE DRAWINGS

Figure 1:
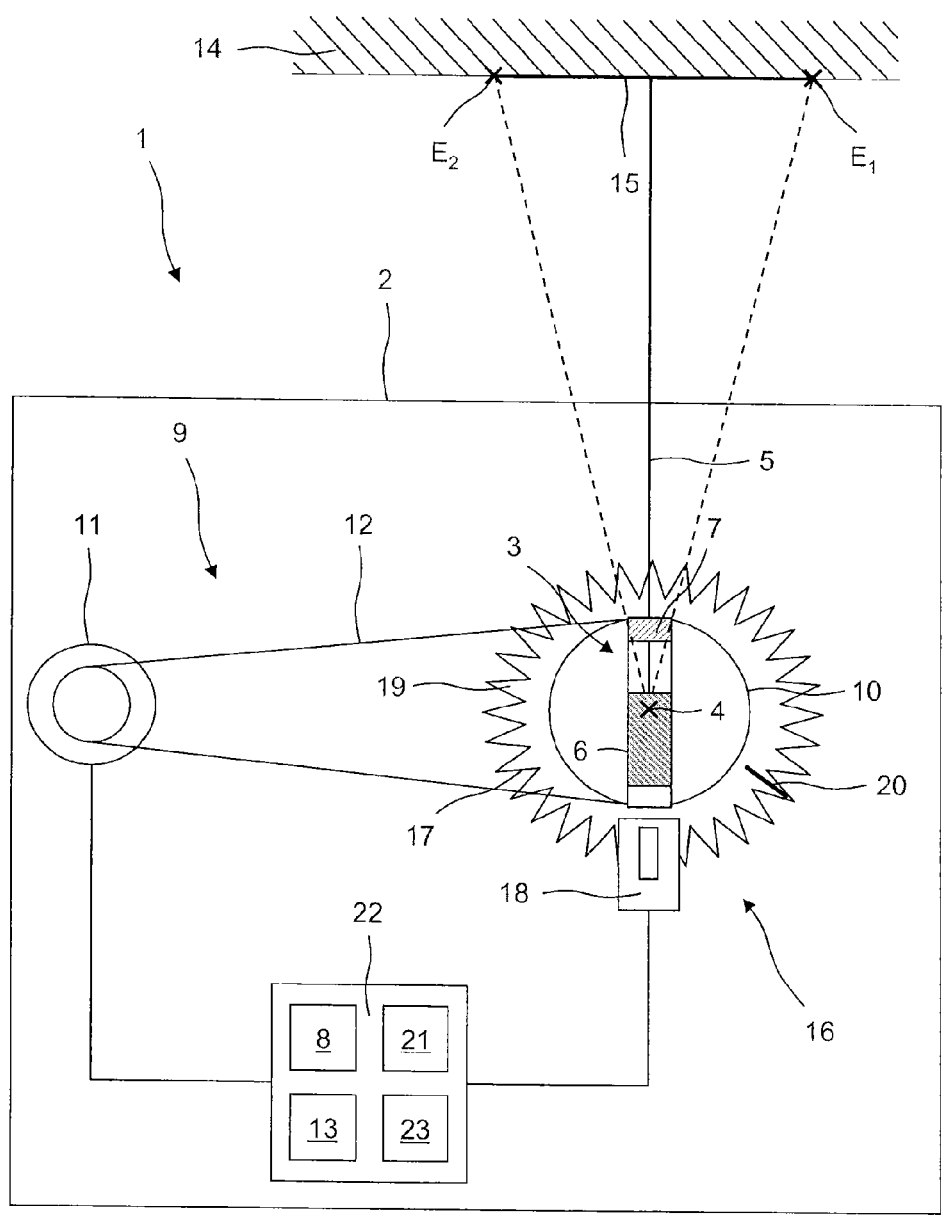
FIG. 1 illustrates a rotary laser instrument according to the invention with an encoder device for measuring a rotation angle of a rotating device.

FIG. 1 shows a schematic representation of a laser instrument 1 according to the invention, which is configured as a rotary laser instrument and can be operated in a line mode. The rotary laser instrument 1 includes a housing 2 and a laser device 3 arranged in the housing 2, which is configured to be rotatable around an axis of rotation 4.

The laser device 3 generates a laser beam 5 and includes a beam source 6 and an optical element 7 for beam shaping of the laser beam, which is designated as beam-shaping optics. The beam source 6 is configured as a semiconductor laser, which generates a laser beam 5 in the visible spectrum, for example a red laser beam with a wavelength of 635 nm or a green laser beam with a wavelength of 532 nm. After the laser beam 5 exits from the beam source 6 there is an expansion of the laser beam 5 because of the divergence. The laser beam is collimated with the aid of the beam-shaping optics 7 and a parallel laser beam is generated. The beam source 6 is controlled by a first control device 8.

The laser beam 5 runs in a plane which is aligned perpendicular to the axis of rotation 4. The laser device 3 is connected with a rotating device 9, which moves the laser device 3 back and forth around the axis of rotation 4 between a first turning point and a second turning point.

The rotating device 9 includes a rotatable shaft 10, a motor unit 11 and a transmission device, which is configured in the form of a toothed belt 12 and transmits the movement of the motor unit 11 to the shaft 10. The laser device 3 is coupled with the rotatable shaft 10 and rotatable around the axis of rotation 4. The rotating device 9 is controlled by a second control device 13.

In line mode of the rotary laser instrument 1, the laser beam 5 is projected on a target surface 14. A laser line 15 is produced on the target surface 14 between a first end point $E_1$ and a second end point $E_2$.

The laser power of the laser beam 5 is controlled as a function of the rotation angle or the angular velocity of the rotating device 9. The rotation angle is determined with a measuring device 16, which is configured as an encoder device. The encoder device 16 includes a locking disk 17, which is connected in a rotationally fixed manner to the rotatable shaft 10, and a photo interrupter 18. The locking disk 17 has a plurality of locking elements 19, which are configured identically and are distributed over the outer circumference of the locking disk 17. A reference element 20 corresponding to the zero position of the rotation angle is provided on the locking disk 17 along with the locking elements 19. The encoder device 16 is calibrated prior to angle measurement via the reference element 20. To do so, the rotatable shaft 10 is rotated 360° around the axis of rotation 4 and the pattern of the locking disk 17 is recorded with the photo interrupter 18. A third control device 21 analyzes the photo interrupter 18 and controls the encoder device 16.

The first control device 8 for controlling the beam source 6, the second control device 13 for controlling the rotating device 9 and the third control device 21 for controlling the encoder device 16 are integrated into a control unit, which is configured as a microcontroller 22.

The angular velocity of the rotating device 9 is computed by the microcontroller 22 from the rotation angle and the corresponding time, which is measured by a timing device 23. The timing device 23 is likewise integrated into the microcontroller 22. The resolution of the angular velocity is determined in this case by the width of the locking elements 19.

FIG. 1 depicts a laser device 3, in which the laser beam 5, which is coupled out of the beam source 6, is aligned perpendicular to the axis of rotation 4. Alternatively, the beam source 6 may be arranged so that the laser beam 5 runs parallel to the axis of rotation 4. In this case, an optical element is provided for beam deflection, which is designated as deflection optics and deflects the laser beam by 90° in a plane perpendicular to the axis of rotation 4.

The beam source 6, which generates the laser beam, is connected to the rotatable shaft 10 in a rotationally fixed manner in a first variant and is rotated with the rotatable shaft 10 around the axis of rotation 4. In a second variant, the beam source 6 is decoupled from the rotatable shaft 10 and the deflection optics are connected to the rotatable shaft 10 in a rotationally fixed manner.

Figure 2A:
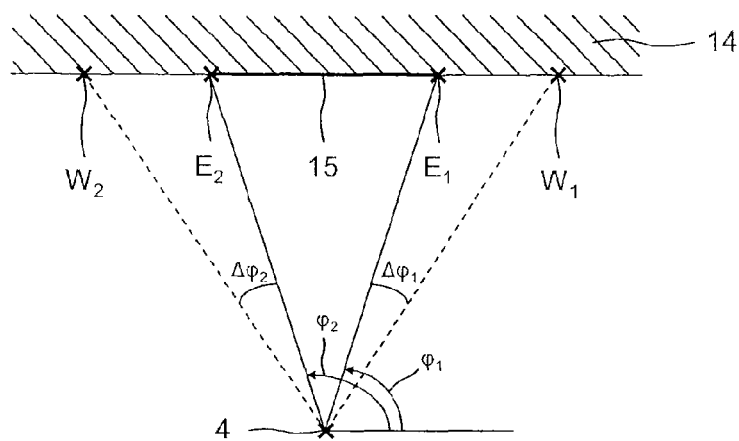
FIGS. 2a and 2b illustrate a first method variation for controlling the laser power as a function of the rotation angle of the rotating device.
Figure 2B:
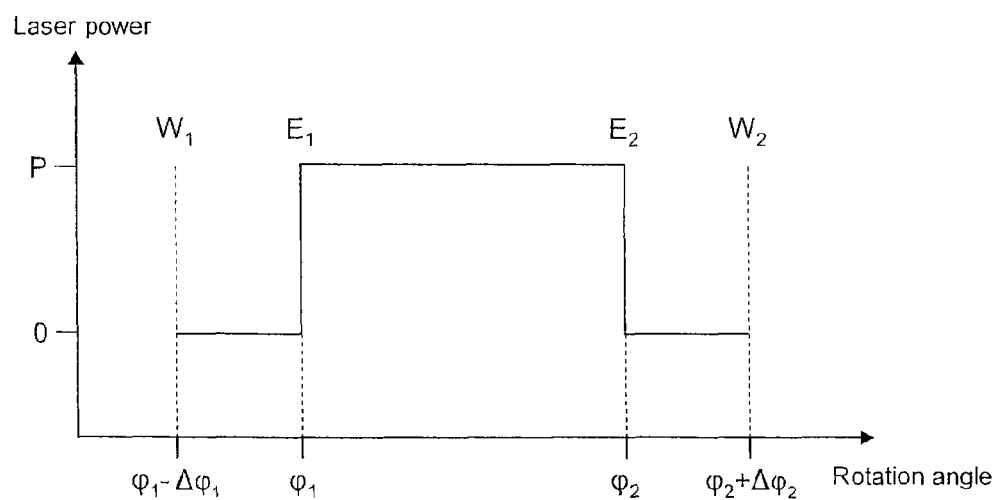

FIGS. 2a and 2b depict a first variant of a method according to the invention for adjusting the laser power in which the laser power is adjusted or controlled as a function of the rotation angle of the rotating device 9. In this case, FIG. 2a shows the target surface 14, on which the laser beam 5 generates the laser line 15 between the first end point $E_1$ and the second end point $E_2$, and FIG. 2b shows the progression of the laser power as a function of the rotation angle of the rotating device 9.

In line mode of the laser instrument 1, the user selects the aperture angle of the laser line 15 and determines the position of the laser line 15 in space. Typical aperture angles are 10°, 45° and 90°. The position of the laser line 15 in space may be adjusted at will by rotating the rotatable shaft 10 around the axis of rotation 4 by 360°.

The rotation angle of the rotatable shaft 10 is determined with the aid of the encoder device 16. The first end point $E_1$ of the laser line 15 corresponds to a first rotation angle $\phi_1$ and the second end point $E_2$ corresponds to a second rotation angle $\phi_2$. The difference of the second rotation angle and the first rotation angle $\phi_2$-$\phi_1$ corresponds to the adjusted aperture angle of the laser line 15. The laser device 3 is moved back and forth around the axis of rotation 4 between a first turning point $W_1$ and a second turning point $W_2$.

The laser power of the beam source 6 is reduced from a constant power value to zero when falling short of the first rotation angle $\phi_1$, and when exceeding the second rotation angle $\phi_2$. The deceleration and acceleration of the rotatable shaft 10 from a constant angular velocity to zero or from zero to the angular velocity takes place in an angle range $\Delta\phi_1$ between the first end point $E_1$ of the laser line 15 and the first turning point $W_1$ of the laser device 3 or in an angle range $\Delta\phi_2$ between the second end point $E_2$ of the laser line 15 and the second turning point $W_2$ of the laser device 3.

Figure 3:
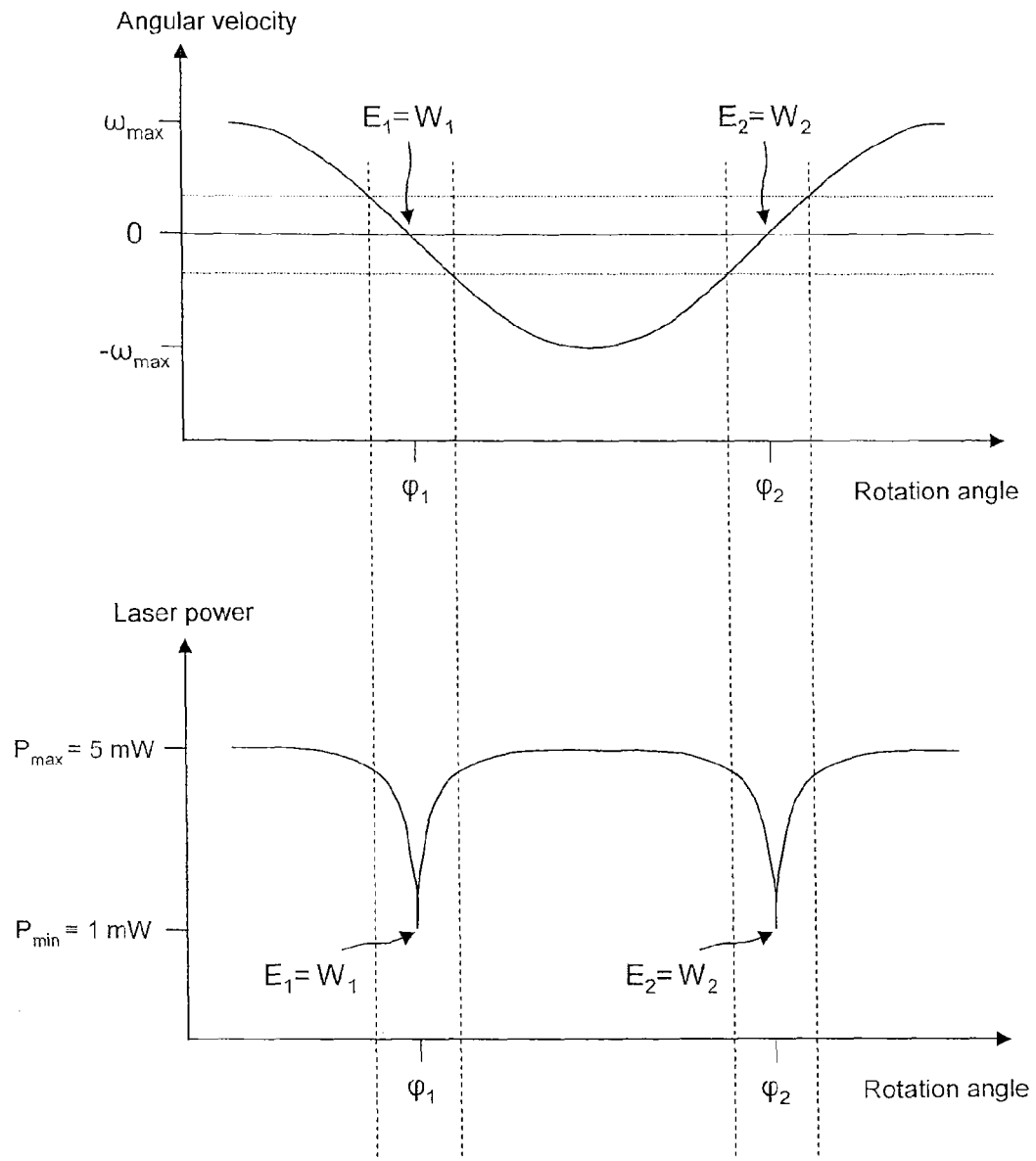
FIG. 3 illustrates a second method variant for controlling the laser power as a function of the angular velocity of the rotating device.

FIG. 3 shows a second variant of a method according to the invention for adjusting the laser power, in which the laser power is controlled as a function of the angular velocity of the rotating device 9. Because the laser power has a direct effect on the visibility of the laser line 15, the objective is to adjust the laser power so that the maximum possible laser power is used at every point of the laser line 15.

The angular velocity with which the rotatable shaft 10 is driven around the axis of rotation 4 by the rotating device 9 is computed by the microcontroller 22 from the rotation angle, which the encoder device 16 determines, and the corresponding time, which the timing device 23 records.

The deceleration and acceleration of the rotatable shaft 10 takes place in the region of the first and second end points $E_1$, $E_2$, wherein the laser beam 5 rests at the end points $E_1$, $E_2$, i.e., the angular velocity is zero. For safety reasons, the laser power is reduced when falling short of a preset limit value of the angular velocity. FIG. 3 shows an example in which the laser power is 5 mW and is reduced to 1 mW when falling short of the limit value. A laser power of 1 mW ensures that there is no risk to the user even at the two end points $E_1$, $E_2$. If the laser beam 5 meets the human eye in the region of the end points $E_1$, $E_2$, the portion of the laser beam that is absorbed by the eye is greater because of the longer exposure time and the risk of damage increases. The longer exposure time is compensated for by the reduced laser power.

The second variant of a method for adjusting the laser power that is depicted in FIG. 3 differs from the first method variant of FIGS. 2a and 2b in that the deceleration and acceleration of the rotatable shaft 10 is carried out between the first end point $E_1$ and the second end point $E_2$ of the laser line 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laser instrument, comprising:
   a laser device;
   a rotating device, wherein the laser device is moveable back and forth around an axis of rotation between a first turning point and a second turning point by the rotating device;
   a control device, wherein a laser power of the laser device is adjustable as a function of a rotation angle and/or an angular velocity of the rotating device by the control device;
   a first measuring device, wherein the rotation angle of the rotating device around the axis of rotation is determinable by the first measuring device; and
   a second measuring device, wherein the angular velocity of the rotating device around the axis of rotation is determinable by the second measuring device.

2. The laser instrument according to claim 1, wherein the first measuring device is an encoder device with a locking disk having locking elements and a photo interrupter, wherein the locking disk is connected to the rotating device in a rotationally fixed manner.

3. The laser instrument according to claim 1, wherein the angular velocity of the rotating device is determinable by the second measuring device from a rotation angle determined by the first measuring device and a time which is recordable by a timing device.

4. A method for adjusting a laser power of a laser beam, comprising the steps of:
   moving a laser device back and forth by a rotating device around an axis of rotation between a first turning point and a second turning point;
   generating a laser line between a first end point and a second end point on a target surface by a laser beam of the laser device; and
   adjusting a laser power of the laser beam as a function of a rotation angle of the rotating device;
   wherein the step of adjusting includes reducing the laser power to zero when falling short of a first rotation angle which corresponds to the first end point and which is greater than a rotation angle corresponding to the first turning point and/or when exceeding a second rotation angle which corresponds to the second end point and which is smaller than a rotation angle corresponding to the second turning point;
   wherein a power value of the laser power is zero in a first angle range between the first end point and the first turning point and in a second angle range between the second endpoint and the second turning point.

5. The method according to claim 4, further comprising the step of decelerating or accelerating the rotating device in the first angle range between the first end point and the first turning point and/or in the second angle range between the second end point and the second turning point.

6. A method for adjusting a laser power of a laser beam, comprising the steps of:
   moving a laser device back and forth by a rotating device around an axis of rotation between a first turning point and a second turning point;
   generating a laser line between a first end point and a second end point on a target surface by a laser beam of the laser device; and
   adjusting a laser power of the laser beam as a function of an angular velocity of the rotating device;
   wherein the step of adjusting includes decreasing the laser power from a first power value to a lower second power value when a preset first angular velocity of the rotating device is fallen short of and increasing the laser power from the second power value to the first power value when exceeding a preset second angular velocity of the rotating device.

7. The method according to claim 6, wherein the laser power changes continuously from the first power value to the second power value.

8. The method according to claim 6, wherein the laser power changes rapidly from the first power value to the second power value.

* * * * *